Sept. 24, 1929.  W. B. BRONANDER  1,729,436

CUT-OFF FOR CIGARETTE MACHINES

Filed July 28, 1928

INVENTOR
Wilhelm B. Bronander
BY
Sydney Prescott
ATTORNEY

Patented Sept. 24, 1929

1,729,436

UNITED STATES PATENT OFFICE

WILHELM B. BRONANDER, OF MONTCLAIR, NEW JERSEY, ASSIGNOR TO AMERICAN MACHINE AND FOUNDRY COMPANY, A CORPORATION OF NEW JERSEY

CUT-OFF FOR CIGARETTE MACHINES

Application filed July 28, 1928. Serial No. 296,056.

This invention relates to cutoffs for continuous rod cigarette machines, its object being to so reduce the weight of the reciprocating parts and to so arrange and construct their operating means, as to make the cutoff suitable for high speed operation, such as from 1200 to 1500 cuts per minute.

Heretofore, the weight of the reciprocating parts in cutoffs has been considerable, mainly because the driving means for the cut-off blade spindle, including the means for rotating the spindle and the means giving the spindle transverse movement to cause the blade to cut the rod, have been reciprocated in addition to the cutoff blade and spindle. This results in prohibitive vibration at speeds for which the present device is designed.

Since the work done by the spindle and cutoff blade is of a light nature, these parts can be and are of light weight construction.

It has been found that by means of a construction in which the spindle and cutoff blade are reciprocated, and in which the heavier driving and supporting means for the spindle are not reciprocated, operation of the cutoff at the high speeds above referred to is made practical. It is, therefore, a principal object of the invention to produce a machine embodying this construction.

In the present device, the cutoff blade is mounted on the end of a spindle carried by a shell rotating around a stationary cam and gear means meshing with a combined cam follower and pinion forming part of the spindle. The cam is so shaped as to impart to the knife shaft a reciprocating motion as the shell turns about the cam and while at the same time the gear rotates the shaft about its axis. Thus, the single motion of rotating the shell about the stationary cam and gear means produces both the revolving and reciprocating motions of the cutter knife.

With the above and other objects in view, the invention consists in certain constructions and combinations which will be hereinafter fully described and then set forth in the appended claims.

In the accompanying drawings which form a part of this specification and in which like characters of reference indicate the same or like parts:

Figure 1:
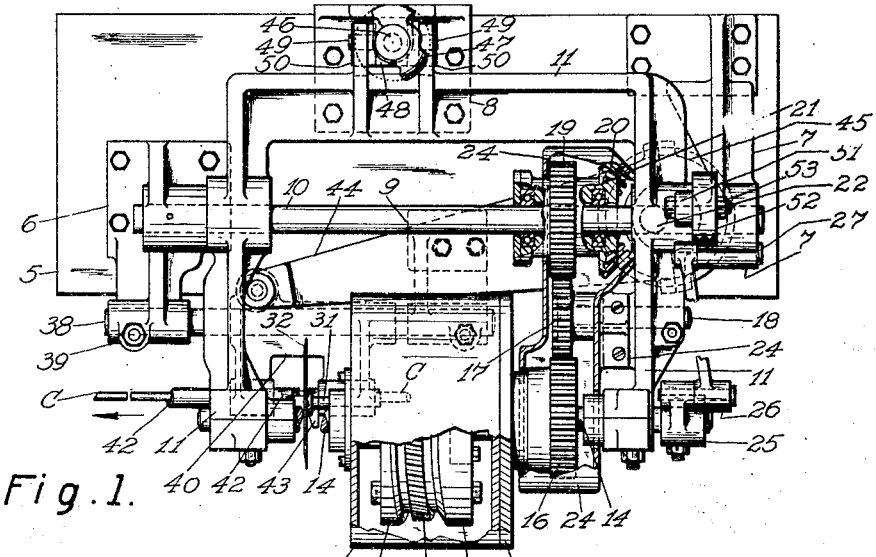
Fig. 1 is a top view of the improved cutoff, partly broken away.

In carrying the invention into effect, there is provided a cutoff blade for cutting off the cigarette rod, a spindle on which said blade is mounted for rapid rotation, a support for the spindle moving in timed relation to operation of the cigarette machine to cause the blade to periodically cut across the cigarette rod, together with stationary means for simultaneously rotating said spindle and reciprocating same with respect to the support lengthwise of the cigarette rod, whereby only a relatively light cutoff blade and spindle are reciprocated. In the best constructions, said means includes a stationary combined cam and gear engaging the spindle. Preferably, the spindle includes a cam follower and pinion for reciprocation and rotation by said cam and gear means respectively. In the best constructions also, a ledger plate having stationary means slidably supporting the same, together with means for reciprocating said plate to cooperate with the cutoff blade in cutting the rod, is provided.

The means above referred to may be widely varied in construction within the scope of the claims, for the particular machine selected to illustrate the invention is but one of many possible embodiments of the same. The invention therefore is not to be restricted to the precise details of the structure shown and described.

The base 5 carries two bearing brackets 6 and 7, an adjusting bracket 8, and a slide shaft bracket 9. The brackets 6 and 7 support a spindle 10 which carries the main frame 11, on which the shell rotates. The shell 12 is mounted on ball bearings 13 carried by shaft 14, which is loosely supported in the arms of frame 11. To the cover 15 of the shell is attached a spur gear 16 driven by an intermediate gear 17 on stud 18, which is held by one of the arms of frame 11. The intermediate gear 17 is in mesh with spur gear 19 on shaft 10, the last named spur gear being attached to, or integral with, the bevel gear 20 driven by bevel gear 21 of the main shaft 22. The gears 19 and 20 are mounted on ball bearings 23 of shaft 10. A gear housing 24 is attached to one arm of the supporting frame 11. The shaft 14 is kept from turning by means of the lever 25, connected by link 26 to stud 27 of bracket 7.

Figure 2:
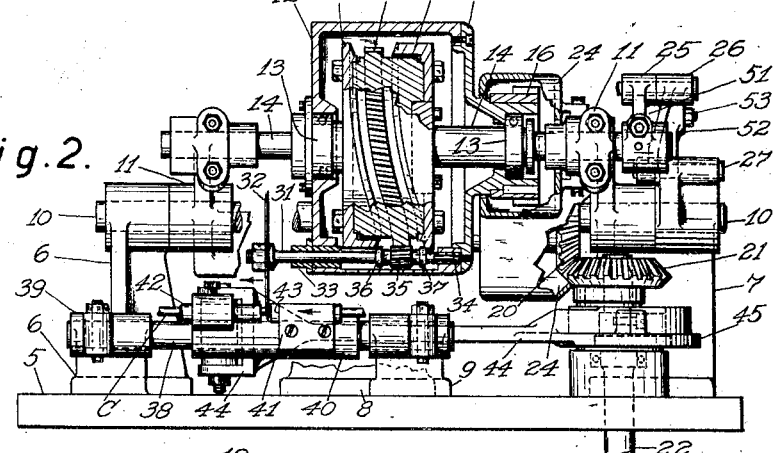
Fig. 2 is a front elevation of the same.
Figure 3:
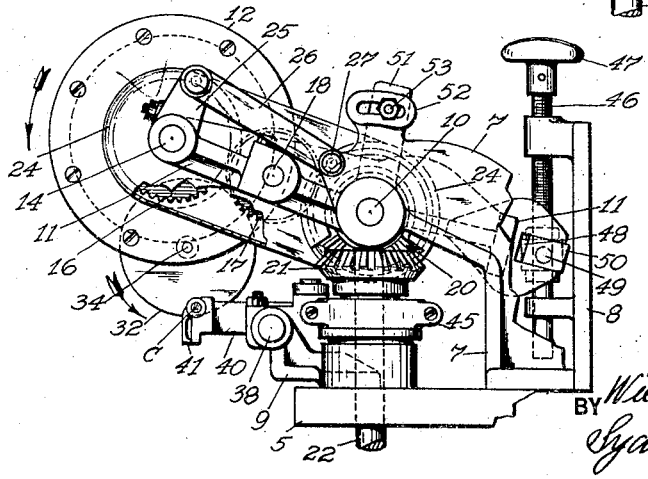
Fig. 3 is a side elevation of the same as seen from the right of Figs. 1 and 2.

Within the shell 12 is stationarily mounted on shaft 14, a gear member 28 having the two cam elements having cam surfaces 29 and 30 on either side of the gear, with the gear and cams fixed together to form a stationary combined cam and gear. As shown in Fig. 2, the teeth of the gear follow a path intermediate between the cam surfaces. Carried by the shell is the shaft 31 on which the cutoff blade 32 is mounted, the blade end of this shaft being journalled in bearing 33 near the circumference of shell 12 and its other end, which is made hollow, being supported on pin 34 projecting from the inside wall of the shell. A pinion 35, forming part of the spindle 31, meshes with the gear 28 while the spherically rounded cam followers 36 and 37, also a part of the spindle, engage with the cam tracks 29 and 30. Thus, as the shell 12 revolves, pinion 35 rolls on the gear 28, thereby revolving the cutting knife 32, which at the same time receives its reciprocating motion from the cam tracks 29 and 30.

The shell 12, being intergeared to the main drive shaft 22 of the continuous rod cigarette machine, said shell will be driven in definite timed relation to the operation of the cigarette machine and to the feeding of the cigarette rod thereby. The contours of the cam tracks 29 and 30 are made such that the shaft 31 in its reciprocation travels forward during the cutting of the cigarette a distance equal to the forward travel of the cigarette rod during the same time. The cutoff blade 32 and the cigarette rod C are, therefore, always relatively stationary with respect to one another during the cutting operation.

A stationary shaft 38, held at either end by brackets 9 and side arm 39 of bearing bracket 6, supports the slide 40 which carries the ledger plate 41 for the cutting knife and the guide tubes 42 and 43 for the cigarette rod C. The slide 40 is connected to the arm 44 of the eccentric 45 mounted on main shaft 22. Thus, the simultaneous parallel motion is produced which is necessary to cause the slide 40 to travel at the same forward speed as the cigarette rod C, while the knife is cutting the rod.

To lower the shell 12, in order to adjust the position of the cutter for decreased diameter due to wear, a screw rod 46 held by the bracket 8 is provided, which is turned by the handwheel or knob 47, thereby raising the nut 48 which, by the pins 49, is turnably coupled to the blocks 50 sliding in the rear arm of the housing support frame 11. When the shell is lowered, swinging around shaft 10, the fixed lever 25, by means of link 26 attached to stud 27, turns shaft 14 with its fixed cams 28, thereby keeping the cutting knife in proper timed relation to cooperate with the ledger plate and pass between the cigarette rod guide tubes 42 and 43. The upwardly projecting arm 51 of frame 11 is adapted to be clamped to the arm 52 of bearing bracket 7 by the bolt 53, thereby locking the frame 11 in its adjusted position.

What is claimed is:

1. In a cutoff device for continuous rod cigarette machines, the combination with a cutoff blade, of a spindle on which said blade is mounted, a support for the spindle moving in timed relation to the operation of the machine to cause the blade to periodically cut across said cigarette rod, and stationary means for simultaneously rotating said spindle and reciprocating the same with respect to the support lengthwise of the cigarette rod.

2. In a cutoff device for continuous rod cigarette machines, the combination with a cutoff blade, of a spindle on which said blade is mounted, a support for the spindle moving in timed relation to the operation of the machine to cause the blade to periodically cut across said cigarette rod, and stationary means for simultaneously rotating said spindle and reciprocating the same with respect to the support lengthwise of the cigarette rod, said means including a stationary cam engaging said spindle.

3. In a cutoff device for continuous rod cigarette machines, the combination with a cutoff blade, of a spindle on which said blade is mounted, a support for the spindle moving in timed relation to the operation of the machine to cause the blade to periodically cut across said cigarette rod, and stationary means for simultaneously rotating said spindle and reciprocating the same with respect to the support lengthwise of the cigarette rod, said means including a stationary combined cam and gear engaging said spindle.

4. In a cutoff device for continuous rod cigarette machines, the combination with a cutoff blade, of a spindle on which said blade is mounted, a support for the spindle moving in timed relation to the operation of the machine to cause the blade to periodically cut across said cigarette rod, and stationary means for simultaneously rotating said spindle and reciprocating the same with respect to the support lengthwise of the cigarette rod, said means including a stationary cam track and a stationary gear and said spindle having a cam follower and pinion for coaction respectively with said track and gear.

5. In a cutoff device for continuous rod cigarette machines, the combination with a cutoff blade, of a spindle on which said blade is mounted, a support for the spindle moving in timed relation to the operation of the machine to cause the blade to periodically cut across said cigarette rod, and stationary means for simultaneously rotating said spindle and reciprocating the same with respect to the support lengthwise of the cigarette rod, said means including a stationary cam and gear means, and said spindle including a combined cam follower and pinion for reciprocation and rotation by said cam and gear means.

6. In a cutoff device for continuous rod cigarette machines, the combination with a cutoff blade, of a spindle on which said blade is mounted, a support for the spindle moving in timed relation to the operation of the machine to cause the blade to periodically cut across said cigarette rod, and stationary means for simultaneously rotating said spindle and reciprocating the same with respect to the support lengthwise of the cigarette rod, said means including a stationary driving member engaging said spindle and said moving support comprising a frame rotating about said stationary member.

7. In a cutoff device for continuous rod cigarette machines, the combination with a cutoff blade, of a spindle on which said blade is mounted, a support for the spindle moving in timed relation to the operation of the machine to cause the blade to periodically cut across said cigarette rod, and stationary means for simultaneously rotating said spindle and reciprocating the same with respect to the support lengthwise of the cigarette rod, said means including a stationary driving member engaging said spindle and said moving support comprising a shell rotating about said stationary member.

8. In a cutoff device for continuous rod cigarette machines, the combination with a cutoff blade, of a spindle on which said blade is mounted, a support for the spindle moving in timed relation to the operation of the machine to cause the blade to periodically cut across said cigarette rod, and stationary means for simultaneously rotating said spindle and reciprocating the same with respect to the support lengthwise of the cigarette rod, and stationary means slidably supporting a ledger plate for reciprocation along the cigarette rod, and means for reciprocating said plate to cooperate with the blade in cutting the rod.

In testimony whereof, I have signed my name to this specification.

WILHELM B. BRONANDER.